United States Patent
Blattner et al.

(10) Patent No.: US 9,296,504 B2
(45) Date of Patent: Mar. 29, 2016

(54) ANTIMICROBIAL PACKAGING SYSTEM

(75) Inventors: Phillip W. Blattner, Dodge City, KS (US); James C. Graves, Dodge City, KS (US); Gary B. Hersh, Dodge City, KS (US); David Michael Kalscheur, Dodge City, KS (US); Steven Joseph Scott, Dodge City, KS (US); Joaquin L. Urias, Dodge City, KS (US)

(73) Assignee: National Beef Packing Company, LLC, Kansas City, MO (US)

( * ) Notice: Subject to any disclaimer, the term of this patent is extended or adjusted under 35 U.S.C. 154(b) by 138 days.

(21) Appl. No.: 13/475,796

(22) Filed: May 18, 2012

(65) Prior Publication Data

US 2012/0231130 A1 Sep. 13, 2012

Related U.S. Application Data

(62) Division of application No. 12/918,304, filed as application No. PCT/US2010/045578 on Aug. 16, 2010.

(60) Provisional application No. 61/243,830, filed on Sep. 18, 2009.

(51) Int. Cl.
*B65B 55/00* (2006.01)
*B65B 43/36* (2006.01)
(Continued)

(52) U.S. Cl.
CPC . *B65B 43/36* (2013.01); *A23B 4/10* (2013.01); *A23B 4/30* (2013.01); *B65B 25/001* (2013.01);
(Continued)

(58) Field of Classification Search
CPC ............. A23B 4/20; A23B 4/10; A23B 4/24; A23B 4/30; A23B 4/0056; B65B 25/065; B65B 25/06; B65B 25/062; B65B 55/10; B65B 55/18; B65B 25/067; B65B 9/15; B65B 39/007; A23L 3/3463; A23L 3/34635; A23L 3/358; B26D 7/0641

USPC .................. 426/323–324, 326, 332, 410, 232; 53/426, 459, 469, 385.1, 493, 431, 53/432, 434, 425, 428, 79, 111 R, 512, 53/111 RC, 502–504, 52, 55, 58
See application file for complete search history.

(56) References Cited

U.S. PATENT DOCUMENTS

| | | | | |
|---|---|---|---|---|
| 1,913,828 A | * | 6/1933 | Brennan | .................... B65B 9/15 493/304 |
| 2,887,837 A | * | 5/1959 | Toby | ............................... 53/258 |

(Continued)

FOREIGN PATENT DOCUMENTS

| CA | 1171690 | 7/1984 |
|---|---|---|
| EP | 1786920 | 5/2010 |

(Continued)

OTHER PUBLICATIONS

Byers, Patricia A. and Herbert L. DuPont. "Pooling Method for Screening Large Numbers of *Escherichia coli* for Production of Heat-Stable Enterotoxin, and Its Application in Field Studies." in: Journal of Clinical Microbiology, Apr. 1979, vol. 9, No. 4, pp. 541-543.

(Continued)

*Primary Examiner* — Drew Becker
*Assistant Examiner* — Luana Z. Long
(74) *Attorney, Agent, or Firm* — Seth Black; Black IP, PLLC

(57) ABSTRACT

Implementations of the present invention extend to sanitary systems, methods, and devices configured to package food items with an even coating of an accurate amount of sanitizing agent, such as an antimicrobial agent. In one implementation, an exemplary system comprises a combination of air nozzles, anti-bacterial spray nozzles or spray headers, metering valves, and timers to achieve uniform distribution of an antimicrobial solution into a product package, and subsequently provide a uniform distribution of the antimicrobial solution to the food item.

22 Claims, 8 Drawing Sheets

(51) Int. Cl.

| | |
|---|---|
| *B65B 25/06* | (2006.01) |
| *A23B 4/30* | (2006.01) |
| *A23B 4/10* | (2006.01) |
| *B65B 25/00* | (2006.01) |
| *B65B 35/20* | (2006.01) |
| *B65B 55/10* | (2006.01) |
| *B65B 31/00* | (2006.01) |
| *B65B 35/24* | (2006.01) |

(52) U.S. Cl.
CPC ............... *B65B 25/067* (2013.01); *B65B 35/20* (2013.01); *B65B 55/10* (2013.01); *B65B 31/00* (2013.01); *B65B 35/24* (2013.01)

(56) References Cited

U.S. PATENT DOCUMENTS

| | | | |
|---|---|---|---|
| 3,645,760 A | | 2/1972 | O'Brien |
| 3,741,584 A | * | 6/1973 | Arai ...................... B60R 21/013 137/51 |
| 3,935,691 A | | 2/1976 | Broch |
| 4,021,283 A | | 5/1977 | Weikert |
| 4,447,887 A | | 5/1984 | Imazeki |
| 4,991,633 A | * | 2/1991 | Wong ...................... B65B 31/00 141/10 |
| 5,335,479 A | | 8/1994 | Lemke |
| 5,402,625 A | * | 4/1995 | Halstead .......................... 53/570 |
| 5,415,997 A | | 5/1995 | Atrache |
| 5,433,121 A | | 7/1995 | Torra |
| 5,483,784 A | | 1/1996 | Owensby |
| 5,741,177 A | | 4/1998 | Roberts |
| 5,987,854 A | * | 11/1999 | Killinger ............... B65B 43/123 53/386.1 |
| 6,004,766 A | | 12/1999 | Atrache |
| 6,094,999 A | | 8/2000 | DuBois |
| 6,196,960 B1 | | 3/2001 | Owensby |
| 6,207,406 B1 | | 3/2001 | Wilkins |
| 6,440,373 B1 | | 8/2002 | Gomes |
| 6,868,299 B2 | | 3/2005 | Chandra |
| 6,868,873 B2 | | 3/2005 | Frisk |
| 6,898,539 B2 | | 5/2005 | Tai |
| 6,922,646 B2 | | 7/2005 | Robbins, III |
| 7,021,026 B2 | * | 4/2006 | Griggs ...................... B65B 9/15 53/138.4 |
| 7,093,508 B2 | | 8/2006 | Harris |
| 7,222,469 B2 | * | 5/2007 | Griggs ...................... B65B 9/15 53/138.4 |
| 7,247,330 B2 | * | 7/2007 | Kuethe et al. .................. 426/325 |
| 7,531,163 B2 | | 5/2009 | Samadpour |
| 7,534,584 B2 | | 5/2009 | Samadpour |
| 7,703,262 B2 | | 4/2010 | Till |
| 8,141,329 B2 | | 3/2012 | Zeedyk |
| 2001/0008887 A1 | | 7/2001 | Choudary |
| 2003/0082797 A1 | | 5/2003 | Rastorgoueff |
| 2003/0229293 A1 | | 12/2003 | Hibner |
| 2004/0018120 A1 | | 1/2004 | Rappin |
| 2004/0018575 A1 | | 1/2004 | Rappin |
| 2004/0137486 A1 | | 7/2004 | Benson |
| 2004/0241644 A1 | | 12/2004 | Samadpour |
| 2004/0241773 A1 | | 12/2004 | Samadpour |
| 2005/0034426 A1 | * | 2/2005 | Griggs et al. .................. 53/417 |
| 2005/0201904 A1 | | 9/2005 | Stripling |
| 2005/0257502 A1 | * | 11/2005 | Wild et al. ...................... 53/434 |
| 2006/0239113 A1 | | 10/2006 | Harris |
| 2006/0266131 A1 | | 11/2006 | Graham |
| 2007/0020364 A1 | | 1/2007 | Burnett |
| 2007/0020366 A1 | * | 1/2007 | Luchansky et al. ........... 426/335 |
| 2007/0172561 A1 | | 7/2007 | Hirschey |
| 2008/0102442 A1 | | 5/2008 | Samadpour |
| 2009/0104327 A1 | * | 4/2009 | Pulsfus et al. ................. 426/511 |
| 2009/0258359 A1 | | 10/2009 | Samadpour |
| 2009/0269760 A1 | | 10/2009 | Samadpour |

FOREIGN PATENT DOCUMENTS

| | | |
|---|---|---|
| JP | 10151134 | 6/1998 |
| RU | 2100793 | 12/1997 |
| WO | 9834107 | 8/1998 |
| WO | 2006017832 | 8/2005 |

OTHER PUBLICATIONS

Cousin, M.A, et al. "Psychrotrophic Microorganisms." in: Compendium of Methods for the Microbiological Examination of Foods (Fourth Edition), (Washington D.C., American Public Health Association, 2009), pp. 159-166.

Currie, Marian J. et al. "Pooling of Clinical Specimens Prior to Testing for Chlamydia trachomatis by PCR is Accurate and Cost Saving." in: Journal of Clinical Microbiology, Oct. 2004, vol. 42, No. 10, pp. 4866-4867.

Davies, R.H. et al. "Evaluation of the use of pooled serum, pooled muscle tissue fluid (meat juice) and pooled faeces for monitoring pig herds for *Salmonella*." in: Journal of Applied Microbiology, 2003, No. 95, pp. 1016-1025.

Entis, Phyllis, et al. "Rapid Methods for Detection, Identification, and Enumeration." in: Compoendium of Methods for the Microbiological Examination of Foods (Fourth Edition), (Washington D.C., American Public Health Association, 2009), pp. 159-166.

"Testing meat for *E. coli* 0157:H7 or H-." in: Food Science Australia, Feb. 2002.

Andrews, Wallace H. and Thomas S. Hammack. "BAM: Food Sampling/Preparation of Sample Homogenate." in: Bacteriological Analytical Manual, Apr. 2003. Retrieved online on Apr. 24, 2012.

"Microbiological testing program and other verification activities for *Escherichia coli* O157:H7 in raw ground beef products and raw ground beef components and beef patty components." in: FSIS Directive, Exhibit 6, Mar. 31, 2004.

Gabis, D.A. and J.H. Silliker. "ICMSF methods studies. II. Comparison of analytical schemes for detection of *Salmonella* in high-moisture foods." in: Can. J. Microbiology, vol. 20, 1974, pp. 663-669.

Gast, Richard K. "Detection of *Salmonella enteritidis* in experimentally infected laying hens by culturing pools of egg contents." in: Poultry Science (1993), vol. 72, pp. 267-275.

Gast, Richard K. and Peter S. Holt. "Incubation of egg contents pools at an elevated temperature (42 C) does not improve the rapid detection of *Salmonella enteritidis* phage type 14b." in: Journal of Food Protection, vol. 67, No. 8, 2004, pp. 1751-1754.

Hendriksen, Rene S. "Global Salm-Surv: A global *Salmonella* surveillance and laboratory support project of the World Health Organization." in: Laboratory Protocols Level 4 Training Course, First Ed., Feb. 2003, pp. 1-18.

Hughes, Denise et al. "*Salmonella* in foods: new enrichment procedure for TECRA *Salmonella* visual immunoassay using a single RV (R10) only, TT only, or dual RV (R10) and TT selective enrichment broths (AOAC official method 998.09): Collaborative study." in: Journal of AOAC International, vol. 86, No. 4, 2003, pp. 775-790.

Micro organisms in foods 2 sampling for microbiological analysis: principles and specific applications (Blackwell Scientific Publications, second edition).

Jarvis, B. "Statistical aspects of the microbiological analysis of foods." in Progress in Industrial Microbiology, (Elsevier, Amsterdam 1989) vol. 21, pp. 117-142.

Kapala, J. et al. "Pooling cervical swabs and testing by ligase chain reaction are accurate and cost-saving strategies for diagnosis of Chlamydia trachomatis." in: Journal of Clinical Microbiology, Jul. 2000, vol. 28, No. 7, p. 2480-2483.

Merson, Michael H., et al. "Use of colony pools for diagnosis of enterotoxigenic *Escherichia coli* diarrhea." in: Journal of Clinical Microbiology, Apr. 1979, vol. 9, No. 4, pp. 493-497.

Midura, Thaddeus F. and Raymond G. Bryant. "Sampling plans, sample collection, shipment, and preparation for analysis." in: Compendium of Methods for the Microbiological Examination of Foods (Fourth Edition) (Washington D.C., American Public Health Association, 2009), pp. 13-23.

(56) References Cited

OTHER PUBLICATIONS

Monsur, K.A., et al. "An evaluation of the pooling method for detecting enterotoxigenic *Escherichia coli*." in: J Diarrhoeal Disease Research, Dec. 1986, vol. 4, No. 4, pp. 211-215.

Peeling, Rosanna W. et al. "Pooling of urine specimens for PCR testing: a cost saving strategy for Chlamydia trachomatis control programmes." in: Sex Transm Inf (1998), vol. 74, pp. 66-70.

Price, W.R. et al. "*Salmonella* testing of pooled pre-enrichment broth cultures for screening multiple food samples." in: Applied Microbiology, Apr. 1972, vol. 23, No. 4, pp. 679-682.

Pritchard, Todd J. and Catherine W. Donnelly. "Combined secondary enrichment of primary enrichment broths increases Listeria detection." in: Journal of Food Protection, 1999, vol. 62, No. 5, pp. 532-535.

Renter, David G. et al. "Diversity, frequency, and persistence of *Escherichia coli* O157 strains from range cattle environments." in: Applied and Environmental Microbiology, Jan. 2003, vol. 69, No. 1, pp. 542-547.

Rohlf, James F. et al. "Optimizing composite sampling protocols." in: Environmental Science Technology, 1996, vol. 30, pp. 2899-2905.

Shrift, A. and R.F. Boulette. "Form of selenium in selenite enrichment media for isolation of salmonellae." in: Applied and Environmental Microbiology, 1974, vol. 27, No. 4, pp. 814-816.

Silliker, J.H. and D.A. Gabis. "ICMSF methods studies. I. Comparison of analytical schemes for detection of *Salmonella* in dried foods." in: Can. J. Microbiology, 1973, vol. 19, pp. 475-479.

Thomas, R.J. et al. "Examination of stockfeeds for *Salmonella*." in: Australian Veterinary Journal, Feb. 1981, vol. 57, pp. 69-71.

"Comparison of assurance GDS for *E. coli* O157:H7 enrichment ratios with composite ground beef samples." BioControl Systems, Inc.

Rivas, M. et al. "An evaluation of the pooling culture method for the detection of *Escherichia coli* enterotoxins." in: Rev Argent Microbiol. 1989, Jan.-Mar., vol. 21, No. 1: pp. 21-24.

PCT Written Opinion & International Search Report for application No. PCT/US05/28161 mailed Sep. 27, 2007.

PCT International Preliminary Report on Patentability for application No. PCT/US2005/028161 mailed Sep. 27, 2007.

EPO Prosecution History for European patent application No. 05783958.1.

International Search Report and Written Opinion on Application No. PCT/US2010/045578 (Mailed Mar. 29, 2012).

\* cited by examiner

ANTIMICROBIAL PACKAGING SYSTEM

CROSS-REFERENCE TO RELATED APPLICATIONS

The present invention is a Divisional Application of U.S. National Stage application Ser. No. 12/918,304, filed on Aug. 18, 2010, entitled "Antimicrobial Packaging System," which corresponds to PCT Application No. PCT/US10/45578, filed on Aug. 16, 2010, which claims priority to U.S. Provisional Patent Application No. 61/243,830, filed on Sep. 18, 2009. The entire content of each of the afore-mentioned patent applications is incorporated by reference herein.

BACKGROUND OF THE INVENTION

1. Technical Field

The present disclosure represents devices, systems and methods for sanitary packaging of food items.

2. Background and Relevant Art

Recently, the United States Department of Agriculture (USDA) expanded its interpretation of products subject to recall in the event of a pathogenic contamination event. Prior to this time, a recall event in raw or ground beef trimmings would be limited to just those trimmings and grinds produced at the same time the contaminated product was also being produced. For example, the product that would be affected under the prior USDA interpretation would include only those trimmings and grinds produced between one complete sanitation event, and the next complete sanitation event, with no trimmings or grinds being allowed to carry over from one sanitation period to the next.

More recently, and with the USDA's expanded interpretation, the products subject to recall would include not only trimmings and grinds, but also all primal cuts (whole muscle cuts). This expansion in interpretation greatly increases the costs, and therefore, increases the loss in profits that may be associated with a recall event.

Under the current USDA interpretation, there is a consideration that may give meat producers the ability to use additional microbial interventions on primal cuts as a further process step that would differentiate primal cuts from trim and ground beef in an event of a recall: apply a scientifically proven pathogen reduction process uniformly to all beef primal cuts immediately prior to packaging. In order to satisfy the USDA standards for this consideration, a meat producer must demonstrate that the pathogen reduction process does indeed uniformly apply an accurate amount of an antimicrobial agent to the primal cuts immediately prior to packaging.

There are several conventional antimicrobial agents that have been documented and acknowledged by the USDA as providing the necessary pathogen reduction step. Some antimicrobial agents that have been acknowledged include lactic acid, peracetic acid, ammonia hydroxide, and chlorine dioxide/sodium hypochlorite.

Although several antimicrobial agents may have been approved, the application of the antimicrobial agent to the primal cuts presents various challenges. A primary difficulty in the application process deals with obtaining complete product coverage, i.e., coverage on all surfaces of the primal cut. A second concern is that the antimicrobial agent must be applied at a carefully metered rate so that any individual primal cut does not gain more than 0.49% by weight with the addition of the antimicrobial solution (another USDA requirement). Additionally, application of a antimicrobial agent that provides full coverage and accurate amounts may be cost prohibitive and subject to human error in product handling and application rate.

For example, conventional methods of applying an antimicrobial agent may employ multiple spray nozzles that aim at all sides of the product as it passes along a moving conveyor. The conventional method may employ a split in the conveyor, or a transition between two consecutive conveyors, to spray the underside of the primal cut. Frequently, however, multiple primal cuts may enter the spraying area simultaneously and may be touching, overlapping, or otherwise obstructing the spray nozzles ability to coat all surfaces of any given piece of product. Therefore, such an application method requires constant oversight to ensure proper pacing, spacing, and antimicrobial solution coverage, which in turn increases costs and decreases efficiency.

Other conventional methods may also have difficulty applying the correct amount of the antimicrobial agent, thus causing the weight of the food product to increase over the USDA standard set at 0.49%. For example, in a typical method that employs several spray nozzles, it is may be difficult to meter the actual amount of antimicrobial solution that is applied to an individual piece of product. For instance, although the amount of antimicrobial solution may be metered through a spray nozzle, many times there is overspray and/or under-spray that unpredictably affects the total amount of antimicrobial solution deposited on the piece of product. Thus, in many conventional processes, it is difficult to apply the correct amount of antimicrobial solution.

Moreover, in an effort to provide an even application and correct amount of antimicrobial agent, other convention methods may use labor intensive processes that increase the cost of packaging the meat, and decrease the efficiency of the packaging process. For example, some conventional processes employ workers that individually apply the antimicrobial solution to each piece of product. This process, however, may be time consuming, produce non-uniform results, and be rather expensive when compared to automated processes. Accordingly, there are a number of disadvantages in the conventional art of sanitary packaging of food items.

BRIEF SUMMARY OF THE INVENTION

Implementations of the present invention systems, methods and apparatus configured to package food items with an even coating of an antimicrobial agent. In particular, implementations of the present invention can be configured to efficiently and quickly provide such a coating in a rapid time period. This can enable packaging of a much more sanitary food product, including but not limited to meat primals, without hindering conventional packaging operations or speed.

For example, one exemplary implementation of packaging system includes a delivery portion with an entrance and an exit. The packaging system can further include a package that cooperates with the exit of the delivery portion to receive a food item that is moved through the delivery portion. The package has an interior surface such that an air dispenser positioned proximate to the exit of the delivery portion. The air dispenser can at least partially inflate the package with air. The packaging system further can include a liquid dispenser positioned proximate to the exit of the delivery portion. The liquid dispenser can at least partially coat the interior surface of the package with a sanitizing agent when the package is at least partially inflated.

Similarly, an exemplary packaging device for delivering a food item into a package can include a staging portion configured to accept and hold a food item that is prepared for packaging. The packaging device can further include a delivery portion that has an entrance and an exit. In general, the food item leaves delivery portion and is delivered to a package at or near the exit. The packaging device can also include a controller that controls the packaging device and is communicably connected to a ram, an air dispenser, and a liquid dispenser. The ram can be operatively associated with the staging portion and the delivery portion. The ram moves the food item from the staging portion through the delivery portion and into the package.

Moreover, the air dispenser can be positioned proximate to the exit of the delivery portion and configured to at least partially inflate the package with air; while the liquid dispenser can be positioned proximate to the exit of the delivery portion. The air dispenser and liquid dispenser can be operatively configured to spray the sanitizing agent in a plurality of directions onto an interior surface of the package. In one example, the controller is programmed to have the ram move the food item into the at least partially inflated package that has the interior surface at least partially coated with the sanitizing agent.

In addition to the foregoing, an exemplary method of packaging a food item in a sanitary package can involve inflating a package at least partially with air dispensed from an air dispenser. In addition, the method can involve coating an interior surface of a package at least partially with a sanitizing agent dispensed from a liquid dispenser. Also, the method can involve positioning a food item within the package by pushing the food item into the package with a ram. Furthermore, the method can involve vacuum sealing the package around the food item.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF SOME EXAMPLE EMBODIMENTS

The present invention extends to systems, methods and apparatus configured to package food items with an even coating of an antimicrobial agent. In particular, implementations of the present invention can be configured to efficiently and quickly provide such a coating in a rapid time period. This can enable packaging of a much more sanitary food product, including but not limited to meat primals, without hindering conventional packaging operations or speed.

Accordingly, one will appreciate from the following description and claims that implementations of the present invention provide devices, systems, and methods that package a food item in accordance with conventional food safety standards. This allows the food items, for example primal cuts of meat, treated in accordance with the present invention to avoid recall in the event of a recall relating to trimmings and grinds. Specifically, the devices, systems and methods of packaging a food item provide a uniform coating of antimicrobial agent on the food item that coats the entire food item surface in a manner that effectively protects the food from food born microbial organisms that can be the reason for a recall event.

To provide such advantages, at least one implementation of the present invention provides even application of anti-microbial agent on all sides of the food item. In one implementation, for example, an inventive system/apparatus directly applies a measured, pre-determined amount of antimicrobial solution to an inside surface of a package. When the food item, in turn, enters the package, the agent attaches evenly about the food item inside the package. This type of application contrasts with certain conventional processes that involve coating all sides of a food item prior to packaging, and while resting on a conveyor.

An end-user can apply agent to a food item as described herein in an automated, efficient, and cost effective way. For instance, implementations of the present invention provide devices and systems that an end-user can operate to automatically control the amounts of applied anti-microbial agent. Such devices and systems can also control timing and actuation of spray nozzles, as well as timed delivery of food item into the package. Such automated controls can ensure that almost no additional time or labor is required to apply the antimicrobial solution, thus making the application of antimicrobial solution a cost effective way to increase the safety of packaged food.

Figure 1A:
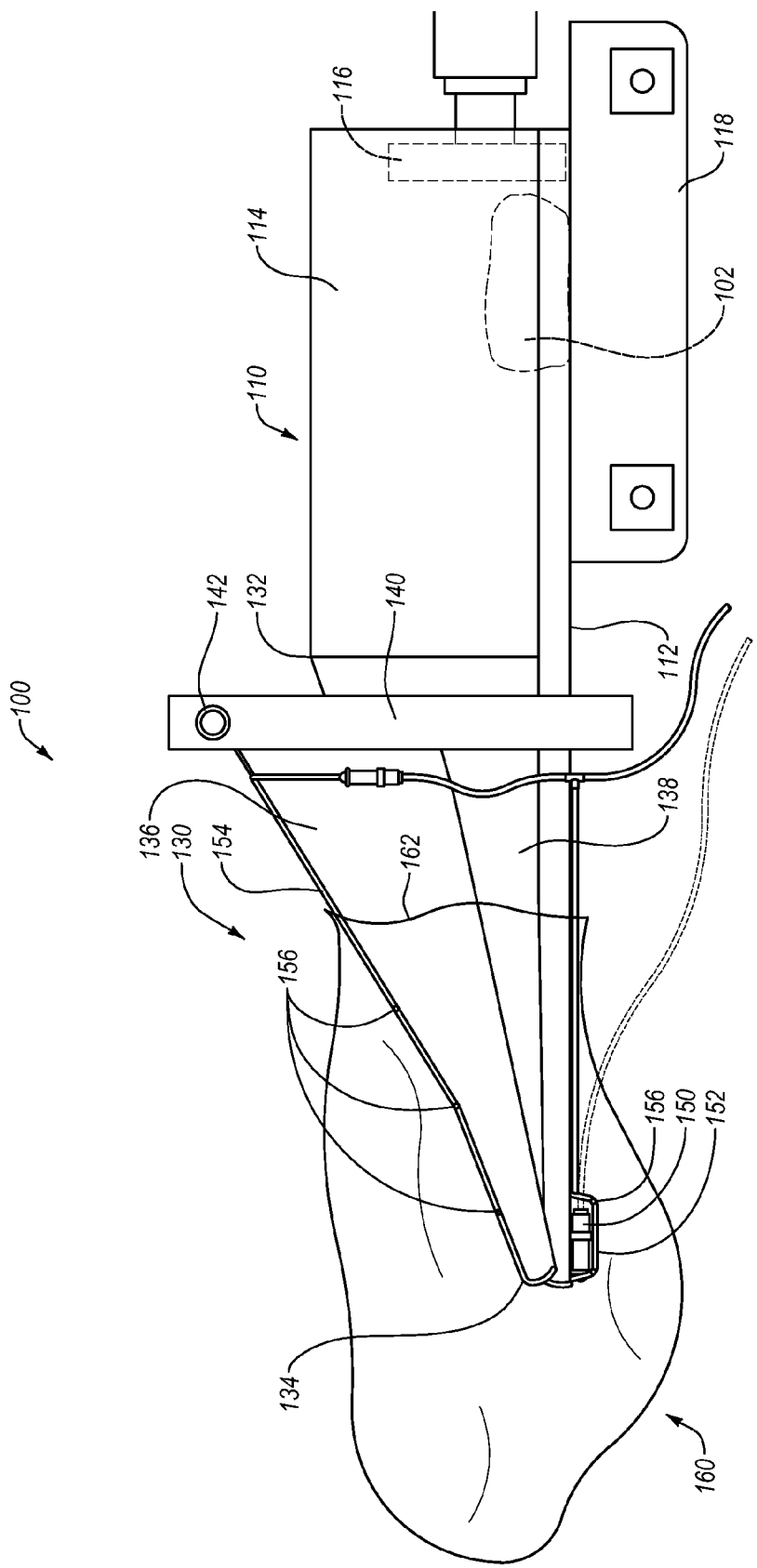
FIG. 1A illustrates an example implementation of a packaging system in a first state of an exemplary packaging process.

FIG. 1A illustrates a side view of an example implementation of a packaging system 100. In particular, FIG. 1A illustrates that the packaging system 100 can include a staging portion 110 coupled to a delivery portion 130. FIG. 1A, in turn, shows that the delivery portion can be operatively coupled to package 160, which ultimately receives a food item 102. Of course, one will appreciate that FIG. 1 illustrates only one example configuration of a packaging system 100, and a manufacturer can vary the configuration from one implementation to the next without departing from the spirit of the present invention. For instance, the size, shape, and operation of system 100, as well as individual components, can vary depending on the specific application of the packaging system 100, or type of food item being packaged.

In particular, one will appreciate that the overall size and configuration of the packaging system 100 can at least somewhat depend on the type and size of a food item 102. In at least one implementation, for example, the packaging system 100 is specifically configured to package primal cuts of beef. In other implementations, the packaging system 100 may be configured to package other cuts of beef, as well as (or alternatively) other meat products, such as chicken, pork, and fish. Moreover, packaging system 100 can be configured to package addition food items 102 that are not meat products. For example, dairy products, such as cheese, and any other food item 102 that may benefit from the application of an antimicrobial agent, can be packaged with the package system 100.

In addition to various overall configuration of the packaging system 100, the material of the packaging system 100 can also vary from one implementation to the next. For example, a manufacturer can make the packaging system 100 out of stainless steel (e.g., 314/316 grade stainless steel), or another food processing grade stainless steel that resists corrosion, and that is easy to sanitize after use. Other suitable materials may also be used depending on the nature of the food item 102 that a food manufacturer packages with the packaging system 100.

Regardless of the packaging system 100 material, and as mentioned above, the packaging system 100 can include the staging portion 110. A manufacturer, for example, can configure the staging portion 110 to accept and hold the food item 102 prior to packaging thereof. For example, FIG. 1A shows that the packaging process may introduce the food item 102 into the staging portion 110 (e.g., in a form and state that is substantially ready to be packaged). As understood more fully herein, the staging portion 110, in turn, can momentarily hold the food item 102 until an operator engages ram 116.

Figure 2:
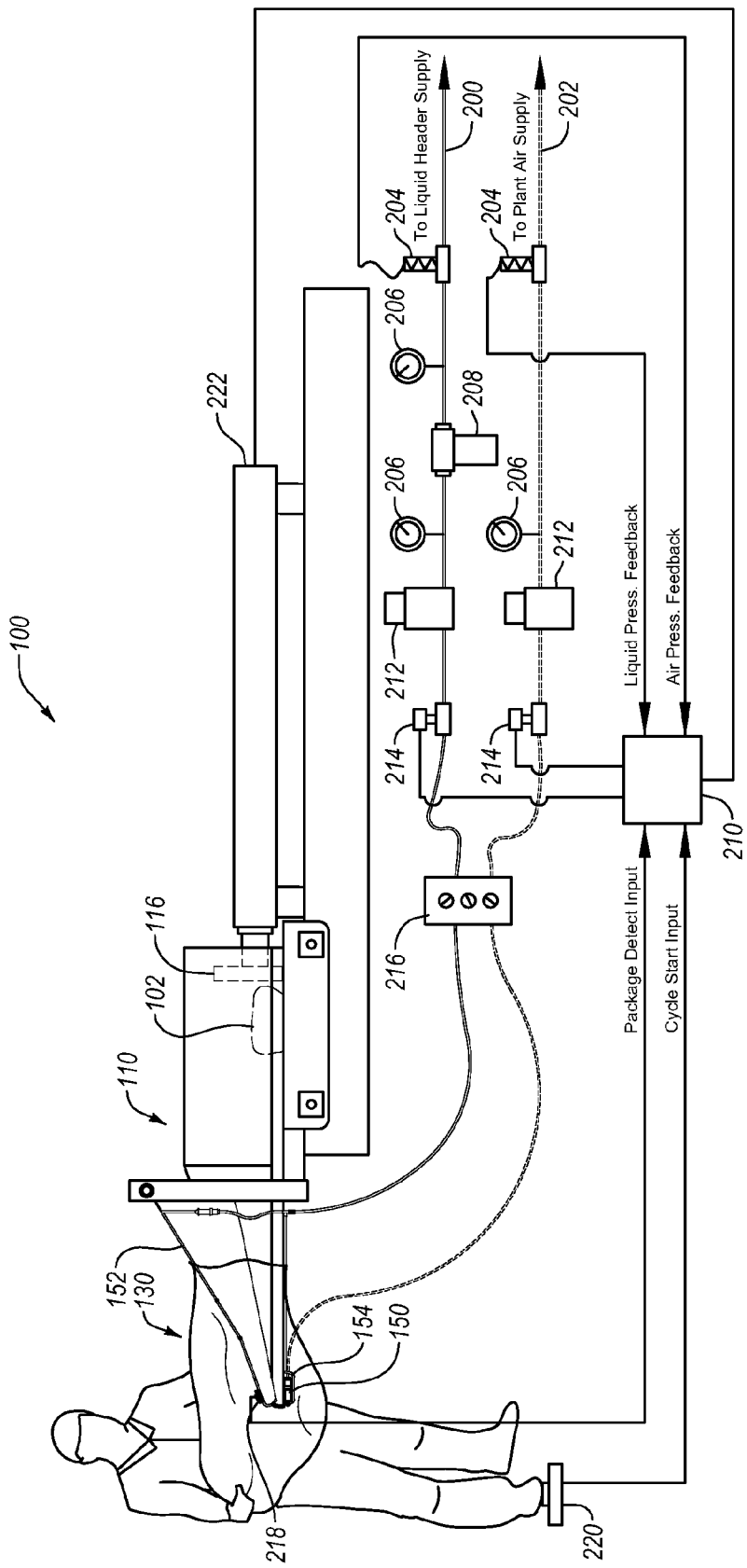
FIG. 2 illustrates a controller schematic view of an example implementation of a packaging system.

FIG. 1A also illustrates that the staging portion 110 can include a mounting bracket 118 that holds the staging portion 110, and thus the packaging system 100, to a support (see FIG. 2). For example, FIG. 1A illustrates an implementation of a mounting bracket 118, which can include a plurality of fastener ports. The end user, in turn, can insert a variety of fasteners into the fastener ports to couple the mounting bracket 118 to the support. For example, an end user can use bolts, screws, washers, and other fasteners to couple the mounting bracket to the fixture.

In one example implementation, a manufacturer can design the mounting bracket 118 such that the position of the staging portion 110 (and thus the position of the packaging system 100) is customizable. In one implementation, for example, the interface between the mounting bracket 118 and the staging portion 110 can include additional hardware (not shown) that can allow a operator of the packaging system 100 to raise or lower the packaging system 100. Such hardware can also allow for an incline and/or rotation of the packaging system 100. Thus, an operator can customize the position of the packaging system 100 to provide a safe and comfortable operating position of the packaging system 100 while in use.

In addition to having a customizable position, the configuration of the staging portion 110 can vary from one implementation to the next. For example, FIG. 1A illustrates one example implementation where the staging portion 110 can include a platform 112 that is surrounded by a side wall 114 to form a cavity or box-type configuration. The side wall 114 can provide a boundary maintains the food item's position. In one implementation, a manufacturer can employ a conveyer system above or adjacent to the platform 112 such that the conveyer system can automatically place the food item 102 in the staging area 110. Alternatively, an operator can manually deposit or position the food item 102 on the platform 112 within the staging area 110.

Although the platform 112 and side wall 114 illustrated in FIG. 1A have a box-type configuration, the configuration of the platform 112 and side wall 114 can vary. For example, the platform 112 and side wall 114 can have a more specific configuration or shape that assists in positioning the food item 102 prior to packaging. For example, as with delivery portion, stating portion 110 can comprise other forms such as conical or triangular shapes. Moreover, a manufacturer can vary the size of the platform 112 and side wall 114 such that only a predetermined volume or weight of food item 102 may be placed on the platform 112. In one implementation, a manufacturer can even exclude the staging portion 110 from the packaging system 100, depending on the method of introducing the food item 102 to the packaging system 100.

In addition to providing a staging area 110, the platform 112 can couple or rest upon a weighing device, such as a scale (not shown). The scale can communicate the weight of the food item 102 to a controller 210 (as will be discussed in greater detail with respect to FIG. 2). This weight determination can allow a controller to automatically determine the amount of sanitizing agent, or antimicrobial agent, to be applied to the interior surface of the package 160. For example, the controller can use a known density of the food item 102 and the weight of the food item 102 to approximate the surface area of the food item, and thus calculate an appropriate amount of sanitizing agent to apply.

Figure 1B:
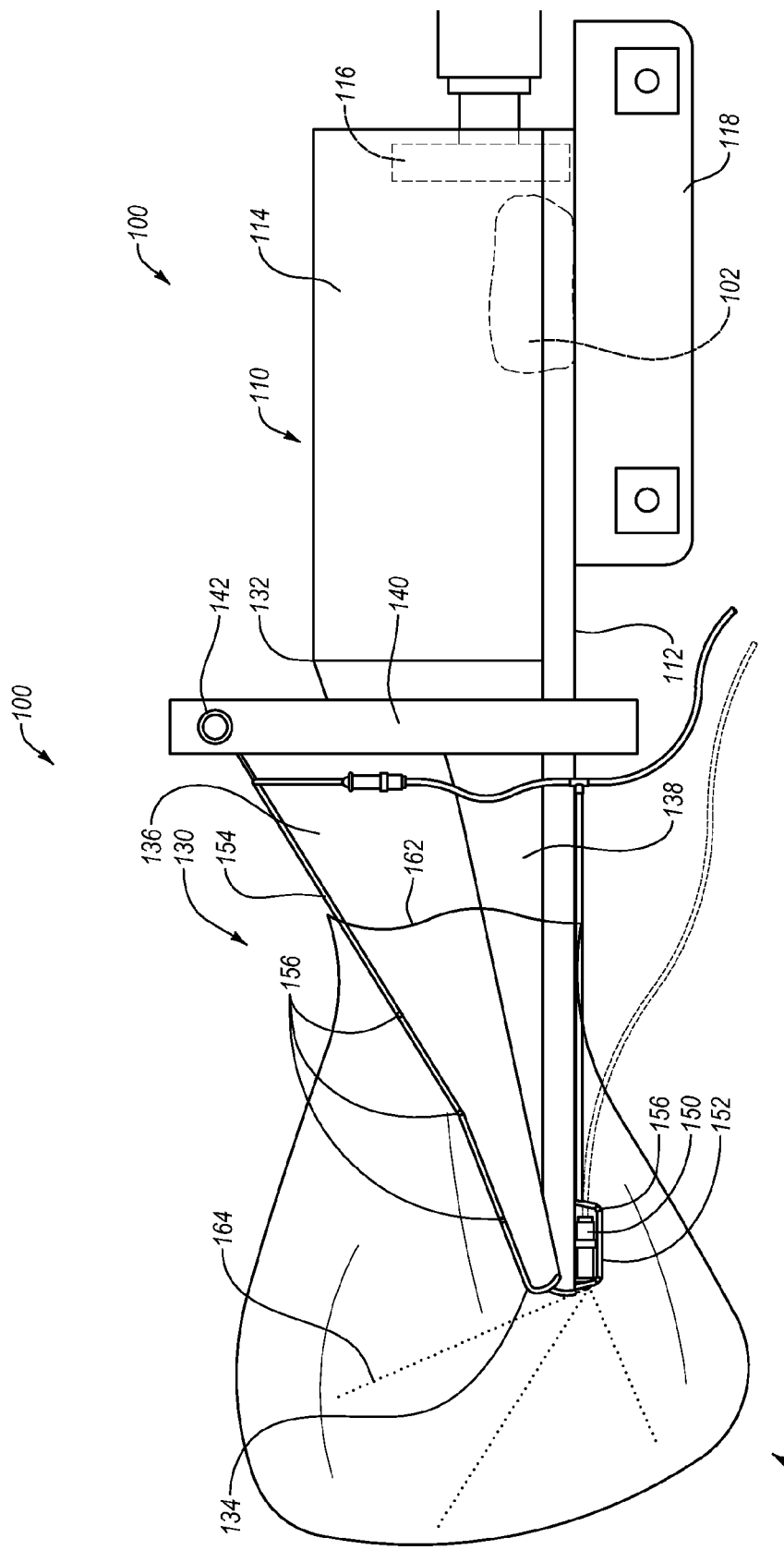
FIG. 1B illustrates the packaging system of FIG. 1A in a second state of an exemplary packaging process.
Figure 1C:
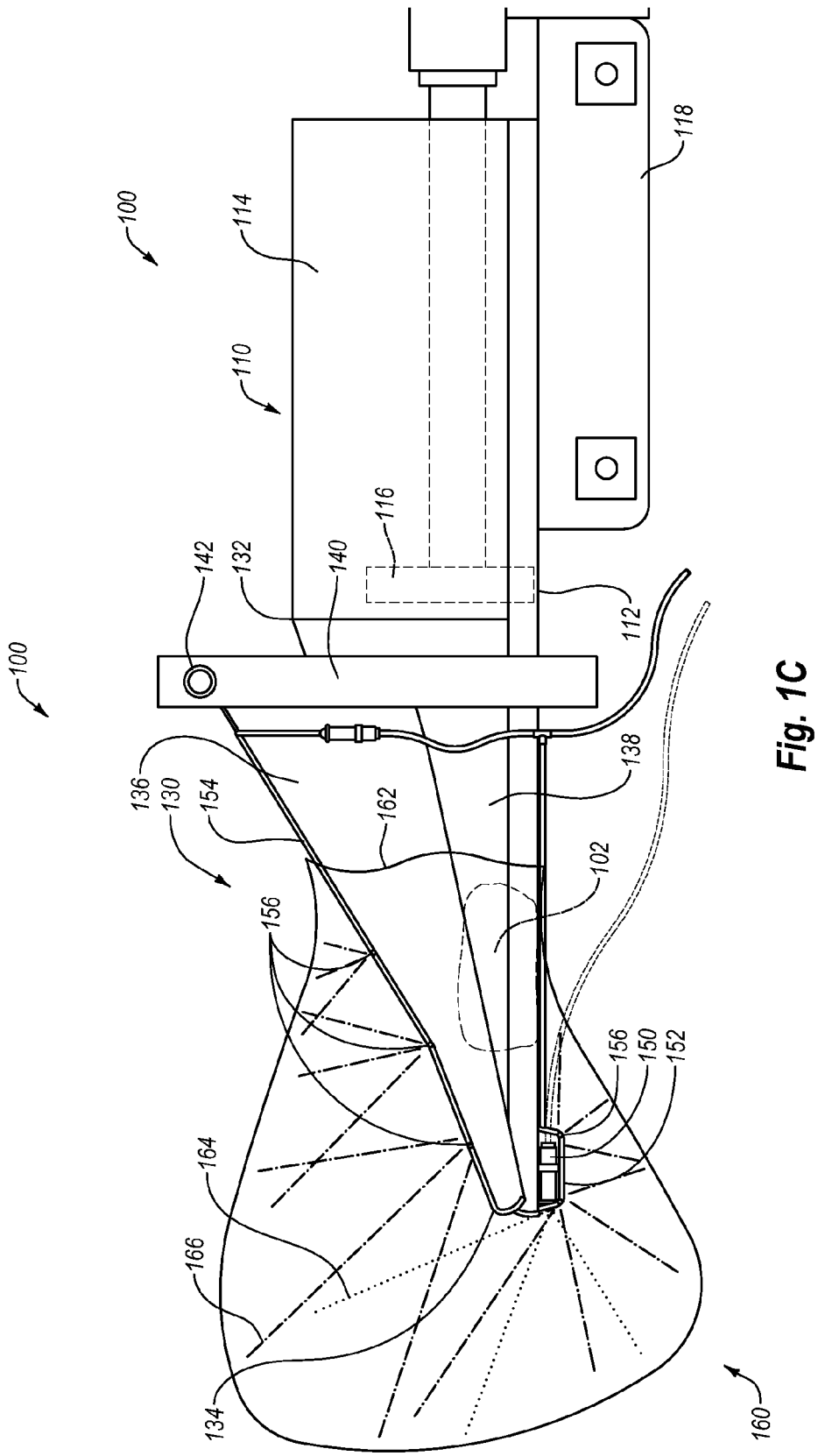
FIG. 1C illustrates the packaging system of FIG. 1A in a third state of an exemplary packaging process.

In order to move the food item 102 from the staging portion 110 and through the packaging system 100, a manufacturer can operatively associate a ram 116 with the staging portion 110. FIG. 1A illustrates that a manufacturer can position the ram 116 to extend through the side wall 114 of the staging area, and to move the food item 102 across the platform 112 and through the delivery portion 130. For example, FIG. 1A illustrates the ram 116 in a retracted position prior to pushing the food item 102. FIG. 1C, on the other hand, illustrates the ram 116 in an extended position after having pushed the food item 102 through the delivery portion 130.

In additional implementations, a manufacturer can employ other devices or means to move the food item 102 into delivery portion 130 (and into the package 160). For example, a manufacturer can incline or alternatively position platform 112 so that the food item slides, or otherwise "drops" into the package 160. Still further, the manufacturer can include a conveyor belt that conveys (rather than pushes with ram 116) the food item 112 into delivery portion 130/package 160.

Even when using the illustrated ram 116, one will appreciate that a manufacturer can employ several types and configurations thereof. For example, the ram 116 can have a substantially cylindrical configuration. Alternatively, the ram 116 may be square, rectangular, or even pyramidal in dimension. In one implementation, the ram 116 configuration, in combination with the configuration of the delivery portion 130, can at least partially shape the food item to a desired shape during delivery.

In addition to the various configurations of the ram 116, a manufacturer can actuate the ram 116 using a variety of different devices. In one example, the ram 116 is coupled to a pneumatic actuator. In this example, a manufacturer can configure the pneumatic actuator to move the ram 116 towards the food item 102 with sufficient force and velocity to effectively push the food item 102 in a matter of no more than about 1-2 seconds. In other implementations, the ram 116 can be associated with an electric actuator, hydraulic actuator, spring loaded actuator, or any other similar means to provide a similar effect.

Notwithstanding the configuration of the ram 116, example implementations of the packaging system 100 further include various configurations of the delivery portion 130. As illustrated in FIGS. 1A through 1E, the delivery portion 130 can include an entrance 132 and an exit 134. The entrance 132 and the exit 134, in turn, can be configured and sized with relation to one another such that the overall configuration of the delivery portion 130 has a snout-like configuration. This snout-like configuration can pivot or adjust as the food item 102 passes therethrough.

One will appreciate that various aspects of the snout-like delivery portion 130 enable efficient coupling with package 160, and delivery of the food item 102. For example, FIG. 1A shows that exit 134 fits easily within the opening 162 of package 160. In addition, FIG. 1A shows that a top portion 136 and a bottom portion 138 of delivery portion 130 are connected via a hinged connection 142. The hinged connection 142, in turn, allows exit 134 to have a variable cross-sectional dimension, as the top portion 136 is allowed to rotate away from the bottom portion 138. Accordingly, exit 134 can increase in size inside package 160 when the ram 116 pushes the food item 102 through the delivery portion 130.

In alternative implementations of the delivery portion 130, for example, a manufacturer can couple both the top portion 136 and the bottom portion 138 to the base 140 with a hinged connection, such that both the top portion 136 and the bottom portion 138 can move with respect to one another. In yet an additional implementation, the manufacturer can configure the exit 134 of the delivery portion 130 to have a fixed cross-sectional dimension, such that the delivery portion 130 only allows a maximum sized food item 102 to pass through the exit 130. In one implementation, the exit 134 can further include trim blades (not shown) that can be used to cut away the portions of the food item 102 that exceed the maximum size.

Regardless of the specific delivery portion 130 and exit 134 configuration, a manufacturer generally can configure the delivery portion 130 to cooperate with one or more specific configurations of the package 160. For example FIG. 1A illustrates that the package 160 includes an opening 162, and is made from a flexible material (e.g., plastic) that can take the shape or form of the food item 102. In alternative implementations, the package 160 can be made from a variety of materials that form virtually any size and configuration.

In one example implementation, the package 160 includes properties and features that allow a food manufacturer to vacuum seal the package after the packaging system 100 places the food item 102 within the package 160. During the vacuum sealing process, all or substantially all of the air is removed from the package 160 such that the package 160 collapses tightly around the food item 102. This in turn causes the package 160 to substantially take the form of the food item 102. A food manufacturer can then seal the opening 162 of the package such that the package 160 remains substantially formed around the food time 102 during shipment or until a consumer opens the package 160.

Regardless of the shape and configuration of the package 160, a manufacturer can configure the delivery portion 130 to deliver a predetermined, accurate, and substantially uniform amount of an antimicrobial agent to the interior surface of the package 160. This can be delivered just prior to, or at substantially the same time as, the food item 102 leaves the exit 134 of the delivery portion 130 and enters the package 160 (See FIGS. 1B and 1C). In one example implementation, the packaging system 100 prepares the package 160 by insuring that the interior surface of the package 160 is substantially exposed (i.e., the package 160 is not folded or overlapping itself). The packaging system 100 then delivers an accurate and substantially uniform amount of the antimicrobial agent to the exposed interior surface of the package 160.

In order to achieve a substantially exposed interior surface of the package 160, the delivery portion 130 can include an air dispenser 150 that can fill or otherwise inflate the package 160 with air just prior to the food item 102 leaving the exit 134 of the delivery portion 130 and entering the package 160. For example, FIG. 1A illustrates an implementation in which a manufacturer has positioned air dispenser 150 on the bottom portion 138 of the delivery portion 130, such that the air dispenser 150 directs air toward the interior surface of the package 160. Thus, a manufacturer can configure the air dispenser 150 to inflate the package 160 with air from the air dispenser 150. As such, the interior surface of the package 160 is substantially exposed (i.e., the package 160 is not folded or overlapping itself).

In one example implementation, the air dispenser 150 comprises one or more nozzles. The one or more nozzles, in turn, can have the ability to provide a variety of air flow patterns into the package 160. For example, at least one air nozzle can provide a wide air flow pattern such that the package 160 quickly fills with air. In other implementations, the air flow pattern can be narrower, depending on the size and configuration of the package 160. In an alternative implementation, the air dispenser 150 can include a fixed nozzle, and/or a variable or rotatable nozzle.

Moreover, just as a nozzle on the air dispenser 150 can vary the air flow pattern, the nozzle can also vary the volume flow rate of the air. For example, a manufacturer can set a combination of air flow pattern and volume flow rate to inflate package 160 in a range of about 0.1 to about 1.5 seconds. The volume flow rate can also be adjusted according to the desired inflation rate of the package 160.

Another way in which the inflation rate of the package 160 can be adjusted is based on the number and/or location of the air dispenser(s). For example, FIG. 1A illustrates the packaging system 100 includes a single air dispenser 150 on the bottom portion 138 of the delivery portion 130. In alternative implementations, the packaging system 100 include a plurality of air dispensers and/or corresponding nozzles on various locations of the delivery portion 130, including not only the bottom portion 138, but also the top portion 136. Furthermore, a manufacturer can direct or aim the air dispenser(s) in a variety of directions such that the package 160 is inflated at a rate and manner that allows substantially the entire interior surface of the package to be exposed.

Once the package 160 is inflated with the air dispenser 150, the packaging system 100 can include liquid dispenser(s) 152 that apply the antimicrobial agent to the interior surface of the package 160. For example, FIGS. 1A through 1B show that the delivery portion 130 can include an upper liquid dispenser 152 and a lower liquid dispenser 154. In one example embodiment, as illustrated in FIGS. 1A through 1F, the lower liquid dispenser 154 and the upper liquid dispenser 152 can comprise a header with a plurality of ports 156 or nozzles through which the antimicrobial agent is released into the package 160.

Of course, one can appreciate that FIGS. 1A through 1D only illustrate one example configuration with respect to the upper liquid dispenser 152 and the lower liquid dispenser 154. For example, the upper liquid dispenser 152 and the lower liquid dispenser 154 can alternatively have an adjustable nozzle configuration. Furthermore, the lower liquid dispenser 154 can have a header configuration while the upper liquid dispenser 152 has a nozzle configuration. Moreover, the upper liquid dispenser 152 and the lower liquid dispenser 154 can each include a combination of nozzle and header elements. In short, the upper liquid dispenser 152 and the lower liquid dispenser 154 can have various configurations, spray patterns, flow rates, positions, and direction of spray to provide an even and uniform coating of antimicrobial agent on the interior surface of the package 160.

Figure 1D:
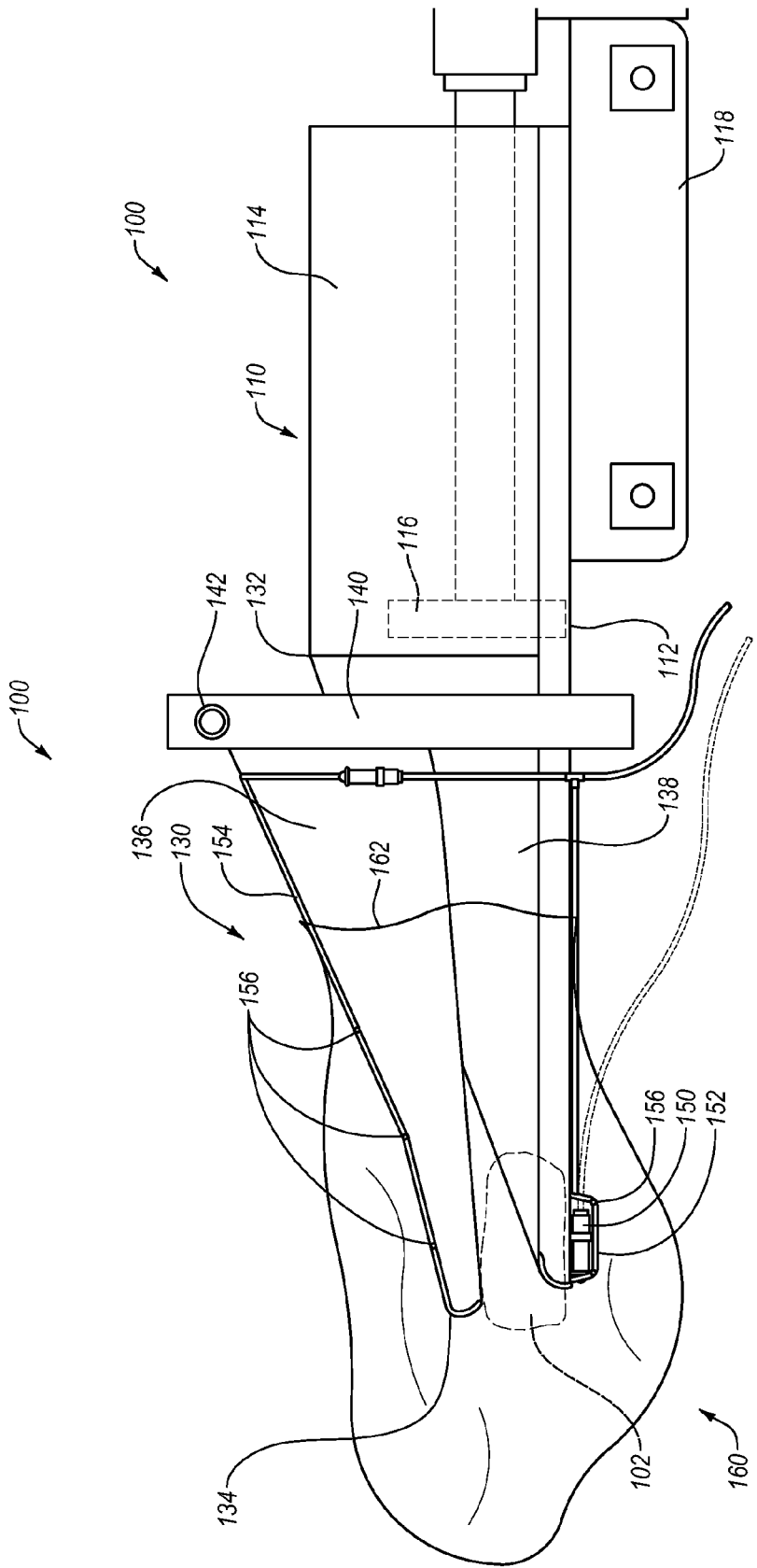
FIG. 1D illustrates the packaging system of FIG. 1A in a fourth state of an exemplary packaging process.
Figure 1E:
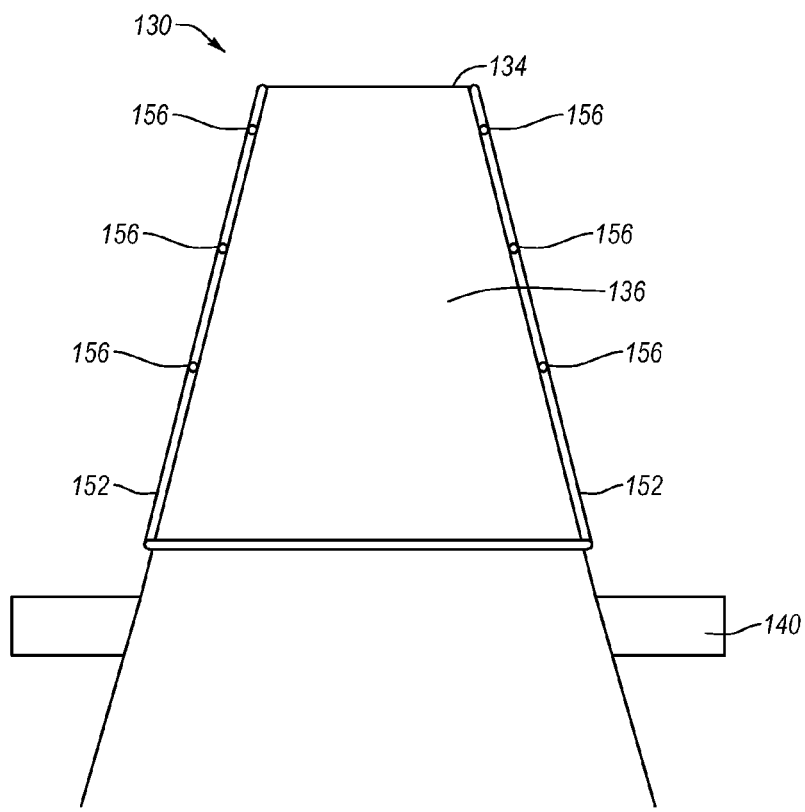
FIG. 1E illustrates a top plan view of the packaging system of FIG. 1A.
Figure 1F:
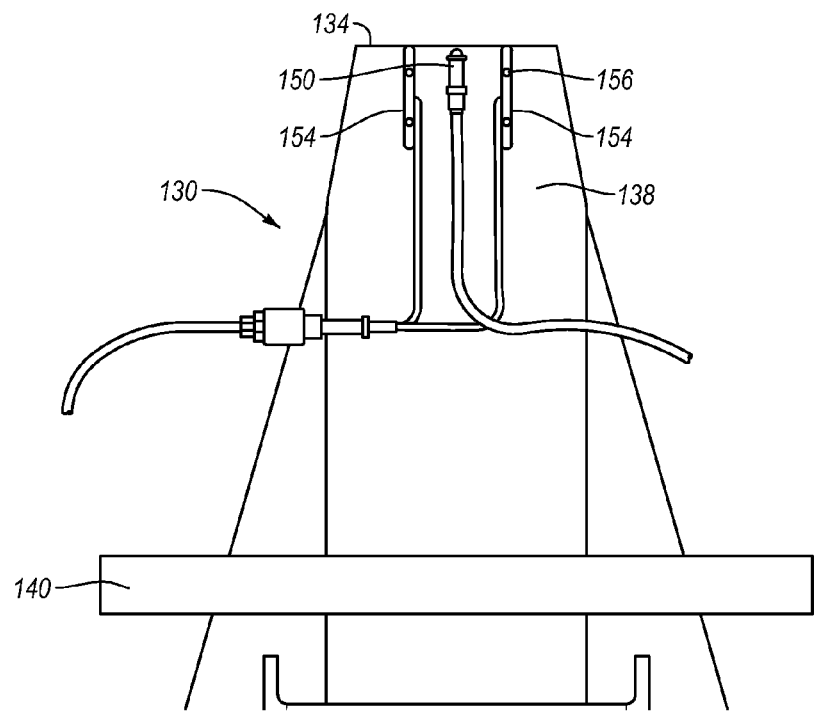
FIG. 1F illustrates a bottom plan view of the packaging system of FIG. 1A.

FIGS. 1E and 1F illustrate top and bottom plan views of the delivery portion 130, respectively, to show further details of the upper liquid dispenser 152 and the lower liquid dispenser 154. In particular, FIG. 1E illustrates that a manufacturer can position the upper liquid dispenser 152 along the sides of the top portion 136 of the delivery portion 130. Depending on the configuration of the package 160, a manufacturer can position the upper liquid dispenser 152 in almost any location on the top portion 136 of the delivery portion 130.

Similarly, FIG. 1F illustrates that a manufacturer can position the lower liquid dispenser 154 in a substantially central location on the bottom portion 138 of the delivery portion 130. Just like the upper liquid dispenser 152, however, a manufacturer can position the lower liquid dispenser 154 in virtually any location on the bottom portion 138 of the delivery portion 130. In some implementations, depending on the size and configuration of the package, a manufacturer can use only one of the upper liquid dispenser 152 or lower liquid dispenser, as long as the single liquid dispenser can evenly apply the antimicrobial agent to the interior surface of the package 160.

In addition to the location of the upper and lower liquid dispensers 152 and 154, FIGS. 1E and 1F illustrate the number and location of the ports 156/nozzles within the header configuration of the liquid dispensers. In particular, FIG. 1E illustrates that the upper liquid dispenser can include three ports per side, while the lower liquid dispenser 154 can include two ports per side. In additional implementations, the upper and lower liquid dispensers 152 and 154 can include more or fewer ports 156, depending on the size and configuration of the package 160, for example.

Notwithstanding the number of ports 156, a manufacturer can configure the ports 156 to have various sizes, directions, flow rates, and spray patterns. For example, each port 156 included on the upper or lower liquid dispensers 152 and 154 can be directed in a particular direction with a specific spray pattern and flow rate. The spray pattern and flow rate can be optimized provide uniform coverage of the interior surface of the package 160 with agent.

The following references FIGS. 1A through 1D in sequence for one particular implementation of the operation of the packaging system 100. For example, FIG. 1A illustrates a first step of using the packing system 100 in which package 160 has been positioned around the exit 134 of the delivery portion 130. In addition, FIG. 1A shows that a food item 102 has been positioned in the staging area 110. As previously discussed, the position of package 160 and food item 102 can be done manually or automatically.

For example, another piece of food processing equipment, such as a conveyer system (not shown), may have automatically loaded the food item 102 onto the platform 112. Likewise, a machine or similar automated device can position the package 160 around the exit 134 of the delivery portion 130. In additional or alternative implementations, an operator simply can use their hands to slide the package 160 over the exit 134 of the delivery portion 130.

FIG. 1B illustrates a second step in which the packaging system 100 inflates the package 160 in preparation of the application of the antimicrobial agent. In particular, FIG. 1B illustrates that air dispenser 150 dispenses an air spray 164 into the package 160 to at least partially inflate the package 160. In one implementation, the air spray 164 completely inflates the package 160. In order to properly inflate the package 160, the air dispenser 150 may be set to dispense the air spray 164 for a pre-determined amount of time. For example, the air dispenser 150 may be configured to dispense the air spray 164 for an amount of time within the range of about 0.1 seconds to about 1.5 seconds. An operator can user longer or shorter dispensing times, depending on the size of the package 160.

FIG. 1C illustrates the packaging system 100 in an example third step. In particular, once the package 160 is inflated, the upper liquid dispenser 152 and the lower liquid dispenser 154 can dispense a liquid spray 166 to the interior surface of the package 160. For example, FIG. 1C illustrates an implementation in which an operator programs the air dispenser 150 and the lower and upper liquid dispensers 152 and 154 to activate during the same period of time. Of course, one will appreciate that an operator can alternatively activate the air and liquid dispensers during different periods of time, or during partially overlapping periods of time.

As discussed with respect to the air dispenser 150, the upper liquid dispenser 152 and the lower liquid dispenser 154 can spray a predetermined amount of liquid spray 166 to ensure uniform distribution. The amount of liquid, or antimicrobial agent, dispensed can be controlled by the flow rate, as well as the amount of time the upper liquid dispenser 152 and the lower liquid dispenser 154 dispense the liquid spray 166. The amount of liquid needed depends on the package 160 size as well as the size and type of the food item 102.

In addition, FIG. 1C shows that just before, during, or just after the liquid dispensers are applying the liquid spray 166 to the package 160, the ram 116 is actuated and moves the food item 102 from the platform 112, through the entrance 132 of the delivery portion 130 and toward the exit 134 of the delivery portion 130. In one implementation, the ram 116 actuation is timed and coordinated with the liquid dispensers 152 and 154, such that the food item 102 is positioned in the delivery portion 130 during dispensing of the liquid spray 166. Thus, the upper liquid dispenser 152 and the lower liquid dispenser 154 can have a consistent spray pattern from one packaging cycle to the next without the food item 102 interrupting or blocking the liquid spray 166.

Once the food item 102 begins to move through the exit 134 of the delivery portion 130, however, the liquid dispensers 152 and 154 cease dispensing additional liquid, shown in FIG. 1D as an example fourth step. The food item 102 then moves completely into the package 160. After the food packaging system 100 positions the food item 102 within the package 160, the operator can then seal the package 160.

In one implementation, an operator can vacuum seal the package 160 with the food item 102 inside the package 160. In this implementation, the vacuum sealing process collapses the package 160 tightly around the food item 102, such that the antimicrobial agent applied to the interior surface of the package 160 comes into contact with the food item 102. In particular, the vacuum sealing process causes further even distribution of the anti-bacterial agent around the food item 102 as the air is removed from the package 160 and the anti-bacterial agent is evenly pressed between the package 160 and all surfaces of the food item 102.

FIG. 2 illustrates is a schematic diagram showing additional components and systems that can be used in conjunction with the packaging system 100. For example, and as previously discussed, FIG. 2 shows various components and systems that can assist in providing control over the air dispenser 150 and the upper and lower liquid dispensers 152 and 154. In particular, FIG. 2 illustrates that the packaging system 100 can include a main liquid line 200 and a main air line 202. The main liquid line 200 and the main air line 202 are connected to a liquid supply and air supply, respectively.

Each of the main liquid line 200 and main air line 202 can further include pressure transducers 204 that monitor the pressure in the main liquid line 200 and the main air line 202. FIG. 2 illustrates that the pressure transducers 204 can communicably connect to a controller 210, such that the controller receives pressure feedback from the main liquid line 200 and the main air line 202. In one implementation, when the pressure in either the main liquid line 200 or the main air line 202 drops below a predetermined pressure, or rises above a predetermined pressure, the controller can shut the packaging system 100 down and produce a corresponding error signal.

In addition to the pressure transducers 204, the main liquid line 200 and the main air line 202 can further include one or more pressure gauges 206. The one or more pressure gauges 206 can allow an operator can physically inspect the pressure at a certain point in the main liquid line 200 or the main air line 202. For example, FIG. 2 illustrates that the main liquid line 200 includes two pressure gauges 206, such that an operator can physically inspect the pressure at a point in the line before a filter 208, and after the filter 208. Although not shown, the main air line 202 can also include more than one pressure gauge 206 and filter 208.

Additionally, the main liquid line 200 and the main air line 202 can include pressure regulators 212 to regulate the pressure that the will be supplied to the air dispenser 150 and liquid dispensers 152 and 154. In one implementation, the pressure regulators 212 can communicably connect to the controller 210. In such an implementation, the controller 210 can control the pressure that is supplied to the air dispenser 150 and the liquid dispensers 152 and 154.

Moreover, the main liquid line 200 and the main air line 202 can connect to a flow control manifold 216 that can control the flow rate through the main liquid line 200 and main air line 202. As with the pressure regulators 212, the flow control manifold 216 can communicably connect to the controller 210 (not shown), such that the controller can control the flow rate through the main liquid line 200 and the main air line 202. Alternatively, an operator can manually set the flow control manifold 216 to provide a constant flow rate through the main liquid line 200 and the main air line 202.

FIG. 2 further illustrates that the main liquid line 200 and the main air line 202 can include one or more electrically activated valves 214. In an exemplary implementation, the electrically activated valves 214 can be solenoid valves that open and close based on a signal from the controller 200. In essence, the electrically activated valves 214 can provide an on/off function to the air dispenser 150 and the liquid dispensers 152 and 154. Thus, when the electrically activated valves 214 are open, the air dispenser 150 and the liquid dispensers 152 and 154 dispense air and liquid, respectively. By contrast, when the electrically activated valves 214 are closed, the air dispenser 150 and the liquid dispensers 152 and 154 do not dispense.

Notwithstanding the illustration in FIG. 2, a manufacturer can arrange the pressure transducer(s) 204, pressure gauge(s) 206, filter(s) 208, pressure regulator(s) 212, electrically activated valves 214, and the flow control manifold 216 in various orders and locations along the main liquid line 200 and main air line 202. Moreover, the packaging system 100 can further include additional transducers, gauges, filters, regulators, meters, and manifolds (not shown) depending on the specific application of the packaging system 100.

As discussed above, FIG. 2 shows that the packaging system 100 can include controller 210 that an operator can program to control various functions of the packaging system 100. Although FIG. 2 illustrates the controller in a schematic, a manufacturer can mount the controller 210 directly to the packaging system 100, or alternatively, the controller 210 can be mounted separate from the packaging system 100. In one example, the controller 210 can attach to the base 140, such that an operator can easily access the controller 210 to adjust the function of the packaging system 100.

One will appreciate that the controller 210 can use a combination of timers, input and output signal monitoring, and signal generators that are controlled by computer-executable instructions to control the packaging system 100. For example, FIG. 2 shows that controller 210 is positioned with one or more lines to control all or many of the above described functions of the packaging system 100, including, but not limited to, dispensing the air spray 164, dispensing the liquid spray 166, and actuating the ram 116.

In one example implementation, the controller can monitor for a cycle start input signal. FIG. 2 illustrates that an operator can prompt the cycle start input signal input by pressing a button 220, such as a foot pedal as shown in FIG. 2. In other implementations, the button 220 can be a hand button or hip switch that provides the cycle start input to the controller 210.

In addition (or as an alternative) to the button providing a cycle start input to the controller 210, a package detector 218 can detect the presence of the package 160 and signal to the controller 210 that the package 160 is in proper position. For example, FIG. 2 illustrates that the packaging system can include the package detector 218 positioned on the exit 134 of the delivery portion 130. The package detector 218 can provide the controller 210 with an input signal to indicate to the controller 210 that the package 160 is positioned properly. If the package 160 is not positioned properly, then the package detector 218 does not provide the input signal to the controller 210, and the controller 210 does not allow the packaging process to continue.

In one implementation, the package detector 218 can be a sensor that can detect the presence of the package 160 about the exit 134 of the delivery portion 130. The sensor may include a proximity sensor, a laser sensor, or any other similar sensory device that can provide an input signal based on the detection of the presence of the package 160.

After the controller 210 receives the cycle start input from the button 220 and/or the package detect input from the package detector 218, for example, then the controller 210 can signal to the electrical activated valve(s) 214 to dispense the air and/or liquid in a predetermined manner. Thereafter, the controller 210 can actuate a actuator 222 connected to the ram 116. Upon actuation, the ram 116 pushes the food item 102 into the package 160 that has the interior surface coated with the antimicrobial agent liquid. In other words, once an operator positions the package 160 around the exit 134 of the delivery portion 130 and presses the button 220, the packaging system 100 automatically inflates the package 160. The packaging system 100 then applies an even coat of antimicrobial agent to the interior surface of the package 160, and pushes the food item into the package 160.

Figure 3:
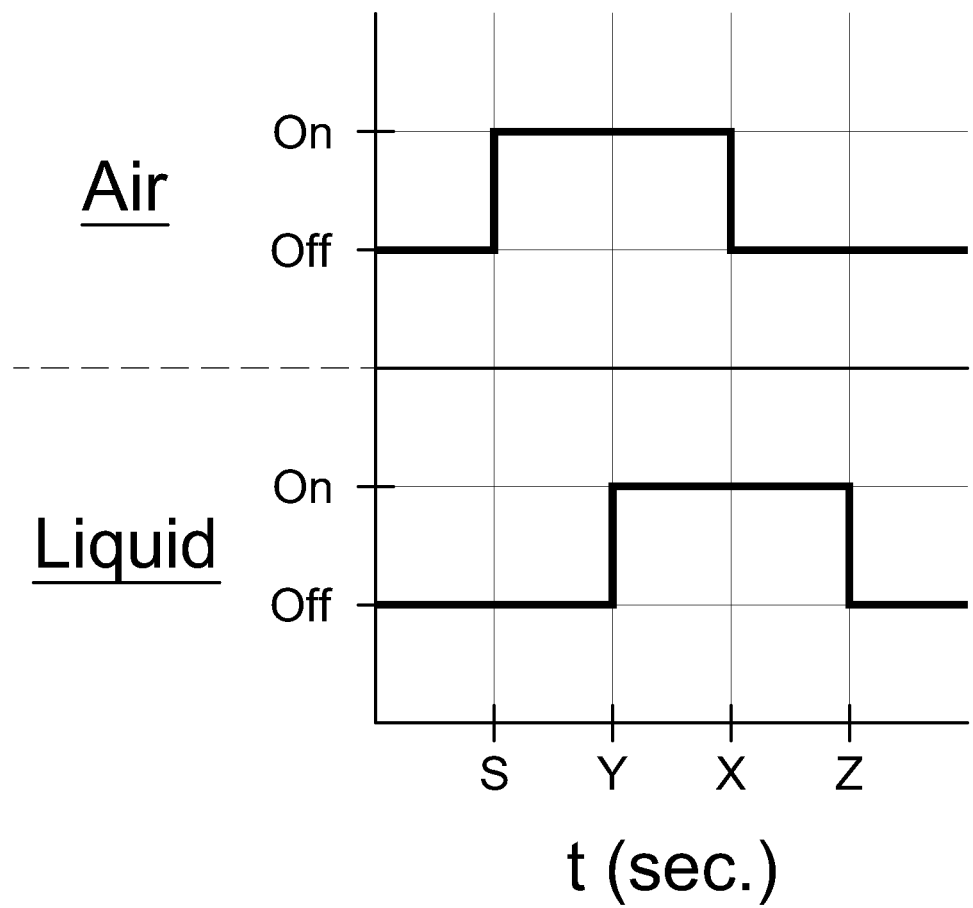
FIG. 3 illustrates a graphical representation of control of a packaging system according to an example implementation of the present invention.

The manner and timing in which the controller 210 controls the air dispenser 150 and the liquid dispensers 152 and 154 can vary from one implementation to the next. As FIG. 3 illustrates, for example, the controller 210 can provide that the air dispenser 150 dispense air for a period of X seconds (e.g., the period between the start of the cycle S and X). The liquid dispensers 152 and 154, however, have a delay for a period of Y seconds (e.g., the period between S and Y). As shown in FIG. 3, X is greater than Y. This means that there is a portion of time when only the air is dispensing (e.g., the period between S and Y), and there is a portion of time when both the air and the liquid is dispensing (e.g., the period between Y and X).

Continuing with the example illustrated in FIG. 3, the controller 210 can signal to the electrical activated valve 214 associated with the liquid dispensers to cause the liquid dispensers to have a spray output for Z seconds, after the delay of Y seconds. Additionally, as illustrated, after X seconds of air output, the controller 210 can signal to the electrical activated valve 214 associated with the air dispenser 150 to cause the air dispenser 150 to stop dispensing air spray 164.

In particular, in one implementation, an operator can program the controller 210 such that the air dispenser 150 and the liquid dispensers 152 and 154 activate during partially overlapping periods of time. For example, the operator can program the controller 210 such that the air dispenser 150 sprays air for a total period of about 0.5 seconds (i.e., the period between S and X), and the liquid dispensers 152 and 154 dispense the antimicrobial agent for a total period of about 0.5 seconds (i.e., the period between Y and Z). In addition, the operator may differentially activate air dispenser 150 and the liquid dispensers 152 and 154 at the same time for only about 0.25 seconds (i.e., the period between Y and X).

In particular, halfway through the 0.5 second air dispensing period, or after about 0.25 seconds of dispensing air, the liquid dispensers 152 and 154 can begin dispensing liquid. In this case, both the air dispenser 150 and the liquid dispensers 152 and 154 are activated for the last half of the air dispensing period (about 0.25 seconds). After the air dispenser 150 completes the total 0.5 second period, the liquid dispensers 152 and 154 can continue to dispense the antimicrobial agent for about another 0.25 seconds to complete the total liquid dispensing period.

The example time periods of X, Y, and Z can all vary such that the periods of overlap differ from one implementation to the next. This variance can be configured depending on the size of package 160, type of food item 102, size of food item 102, and other variables that may affect spray times and patterns. For example, in some implementations, there is no overlap between the air dispensing and the liquid dispensing. Additionally, the air and the liquid dispensing may completely overlap.

Figure 4:
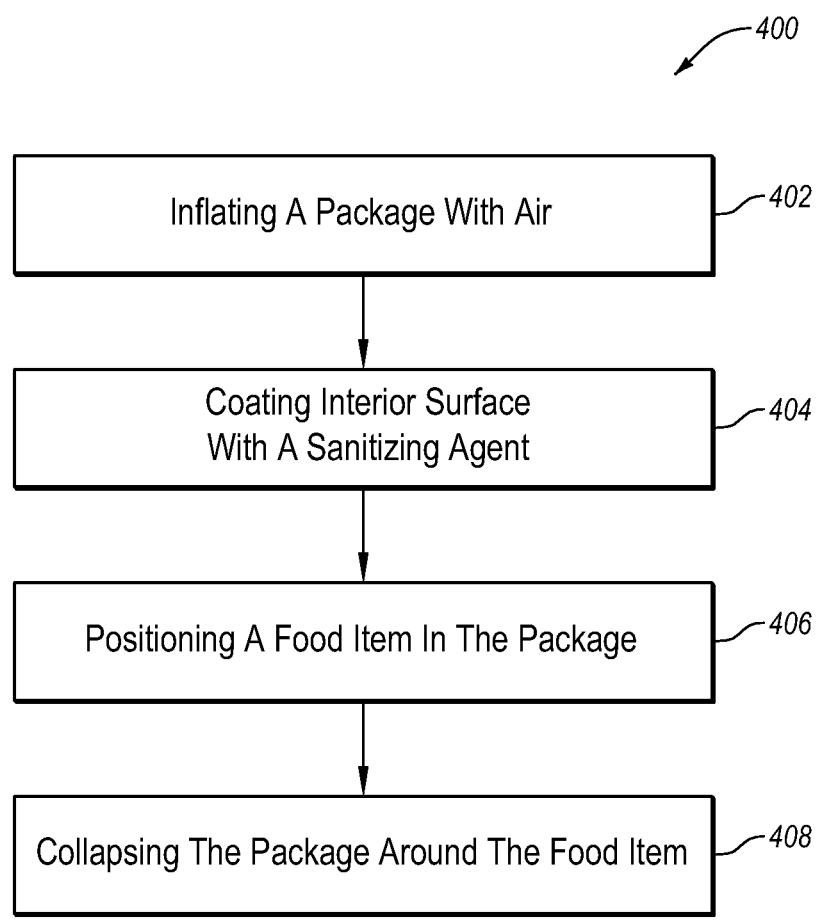
FIG. 4 illustrates an example method of packaging a food item according to implementations of the present invention.

Accordingly, FIG. 1A through FIG. 3 and the corresponding text provide a number of different components and systems that can efficiently package a food item with a predetermined amount and even coating of antimicrobial agent. In addition to the foregoing, implementations of the present invention can also be described in terms of flowcharts comprising one or more acts in a method for accomplishing a particular result. For example, FIG. 4 illustrates a method of packaging a food item in a sanitary package. The acts of FIG. 4 are discussed more fully below with respect to the components discussed with reference to FIG. 1A through FIG. 3.

For example, FIG. 4 shows that the method of packaging a food item in a sanitary package can comprise an act 402 of inflating a bag with air. Act 402 includes inflating a package at least partially with an air dispenser. For example, FIG. 1B illustrates the air dispenser 150 dispensing an air spray 164 to inflate the package 160.

FIG. 4 also shows that the method can comprise an act 404 of coating the interior surface with a sanitizing agent. Act 404 includes coating an interior surface of a package at least partially with a sanitizing agent dispensed from a liquid dispenser. For example, FIG. 1C illustrates the upper and lower liquid dispensers 152 and 154 dispending an antimicrobial agent onto the interior surface of the package 160.

In addition, FIG. 4 illustrates that the method can comprise an act 406 of positioning a food item in the package. Act 406 includes positioning a food item within the package by pushing the food item into the package with a ram. For example, FIGS. 1C and 1D illustrate that ram 116 has pushed the food item 102 into the package 160.

Furthermore, FIG. 4 illustrates that the method can comprise an act 408 of collapsing the package around the food item. Act 408 includes vacuum sealing the package around the food item. For example, after the food item 102 is positioned within the package 160, as illustrated in FIG. 1D, an operator can vacuum seal the package 160 to collapse the interior surface of the package 160 around the food item 102.

Accordingly, the diagrams and text corresponding to FIG. 1A through FIG. 4 illustrate or otherwise describe a number of methods, devices, systems, configurations, and components that an operator can use to package a food item in a sanitary and safe package. Such methods, devices, systems, configurations, and components can provide an efficient, reliable, and repeatable packaging process when compared to conventional devices and methods. For example, and as previously described, successive food items can be individually and uniformly treated and packaged in a matter of mere seconds, or less, per food item. Thus, food manufacturers can use implementations of the present invention to safely, reliably and efficiently package food items in a sanitary package prior to shipping.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method of packaging a food item by automatically and efficiently distributing a liquid sanitizing agent about the food item during packaging, comprising:
    positioning a package about a tapered snout-like delivery portion having an exit with a fixed cross-sectional dimension and one or more trim blades, one or more air nozzles, and one or more liquid nozzles, wherein the package is positioned over each of the one or more air nozzles and each of the one or more liquid nozzles;
    inflating the package at least partially with air dispensed from the one or more air nozzles;
    coating an interior surface of the package at least partially with a liquid sanitizing agent dispensed from the one or more liquid nozzles;
    positioning a food item within the package by pushing the food item into the package with a ram;
    trimming the food item as the food item contacts the one or more trim blades of the exit of the delivery portion; and
    vacuum sealing the package around the food item.

2. The method as recited in claim 1, wherein the inflating, coating, and positioning occurs in less than about two seconds.

3. The method as recited in claim 1, further comprising receiving a package detected signal from a package detector.

4. The method as recited in claim 1, further comprising receiving a start signal from a start input button.

5. A method of packaging and sanitizing a food item by automatically and efficiently distributing a liquid sanitizing agent about the food item during packaging, comprising:
   receiving a food item into a staging portion of a packaging system, wherein the staging portion at least temporarily holds and weighs the food item;
   receiving an electronic signal at a controller that provides a weight of the food item in the staging portion;
   automatically approximating a surface area of the food item at the controller, and determining an amount of a liquid sanitizing agent to apply to the food item;
   dispensing the automatically determined amount of the liquid sanitizing agent from a liquid nozzle into a package;
   dispensing air from a first air nozzle into the package to inflate the package, the first air nozzle having a first air flow pattern and a first air flow rate;
   dispensing air from a second air nozzle into the package to inflate the package, the second air nozzle having a second air flow pattern that differs from the first air flow pattern and a second air flow rate that differs from the first air flow rate;
   varying the first air flow rate and the second air flow rate to maintain inflation of the package;
   delivering the food item from the staging portion into a delivery portion of the packaging system; and
   delivering the food item into the package.

6. The method as recited in claim 5, further comprising weighing the food item to determine the amount of the liquid sanitizing agent.

7. The method as recited in claim 5, further comprising vacuum sealing the package around the food item.

8. The method as recited in claim 5, wherein determining the amount of the liquid sanitizing agent and delivering the food item from the staging portion into the delivery portion of the packaging system occur automatically in less than about two seconds.

9. The method as recited in claim 8, wherein:
   the food item is delivered from the staging portion into the delivery portion of the packaging system via a ram; and
   the ram is coupled to a pneumatic actuator configured to actuate the ram and deliver the food item into the delivery portion of the packaging system in no more than 1-2 seconds.

10. The method as recited in claim 5, further comprising receiving a package detected signal from a package detector.

11. The method as recited in claim 5, further comprising receiving a start signal from a start input button.

12. The method as recited in claim 11, wherein delivering the food item from the staging portion into the delivery portion of the packaging system comprises delivering the food item via a conveyor or via a ram.

13. The method as recited in claim 11, wherein the first air flow pattern comprises a wide air flow pattern and the second air flow pattern comprises a narrow air flow pattern.

14. The method as recited in claim 11, wherein air is dispensed from the first air nozzle aimed in a first direction and the second air nozzle aimed in a second direction that differs from the first direction.

15. The method as recited in claim 11, wherein the liquid sanitizing agent is dispensed into the package by a plurality of liquid nozzles aimed in different directions.

16. The method as recited in claim 11, further comprising continuing to coat the surface of the food item with the liquid sanitizing agent after the food item enters the package.

17. A method of packaging and sanitizing a food item by automatically and efficiently distributing a sanitizing agent about the food item during packaging, comprising:
   determining an amount of sanitizing agent needed to evenly coat an approximated surface area of a food item based on a volume flow rate of the sanitizing agent;
   determining a first time period for delivering the determined amount of sanitizing agent, and a second time period of up to 1.5 seconds for delivering an amount of air into a bag, wherein the determined second time period for delivering the amount of air partially overlaps with the determined first time period for delivering the amount of sanitizing agent;
   receiving an electronic signal that indicates that the food item has been positioned properly in a receiving area, wherein no signal is received if the food item has been positioned improperly in the receiving area;
   upon detection of proper positioning, automatically coordinating delivery of the amount of air, delivery of the determined amount of sanitizing agent, and delivery of the food item into the bag, wherein the determined amount of sanitizing agent is delivered into the bag prior to the delivery of the food item into the bag;
   at least partially shaping the food item during delivery of the food item into the bag; and
   cutting away a portion of the food item during delivery of the food item into the bag by using one or more trim blades positioned on a delivery portion;
   wherein coordinating delivery further comprises sending a plurality of signals to open and close valves for a continuous flow of air, to open and close valves for a continuous flow of sanitizing agent, so as to cause an automated ram to push the food item into the bag after initiation of the determined first time period for delivering the amount of sanitizing agent;
   wherein the food item is entirely positioned within the bag and coated with sanitizing agent at the end of the determined first time period for delivering the amount of sanitizing agent.

18. The method as recited in claim 17, further comprising receiving an actuation signal from an operator that causes initiation of the determined second time period for delivering the amount of air.

19. The method as recited in claim 17, further comprising:
   initiating the determined first time period for delivering the amount of sanitizing agent by sending one or more signals to open a liquid valve in a delivery area;
   wherein a plurality of liquid nozzles connected to the liquid valve dispense sanitizing agent throughout an inside surface of the bag before entry of the food item therein.

20. The method as recited in claim 17, further comprising shaping the food item after initiation of the determined second time period for delivering the amount of air and before the determined first time period for delivering the amount of sanitizing agent.

21. The method as recited in claim 17, further comprising:
   after initiation of the determined second time period for delivering the amount of air, automatically weighing the food item in a staging area; and
   approximating the surface area of the food item;
   wherein the approximated surface area of the food item is used to determine the amount of sanitizing agent for the food item.

22. The method as recited in claim 21, wherein the determined second time period for delivering the amount of air and the determined first time period for delivering the amount of sanitizing agent overlap for 0.25 seconds.

* * * * *